March 7, 1939.  C. W. JOHNSTON  2,149,681
CONTROL DEVICE
Filed Jan. 25, 1937   2 Sheets-Sheet 1

Inventor,
C. W. Johnston
By
Attorney

March 7, 1939.    C. W. JOHNSTON    2,149,681
CONTROL DEVICE
Filed Jan. 25, 1937    2 Sheets-Sheet 2
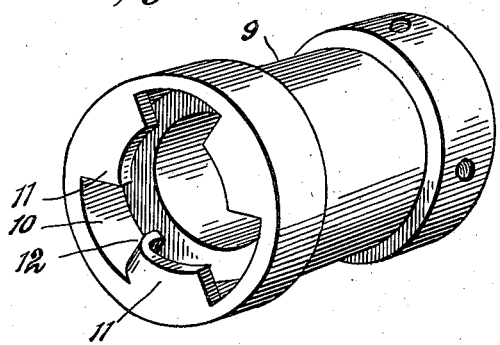
Fig. 5.
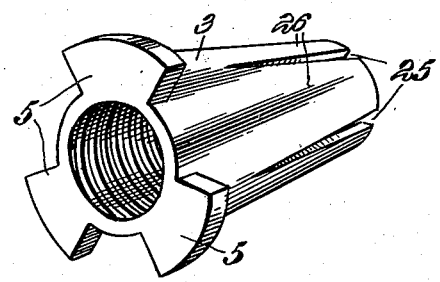
Fig. 7.
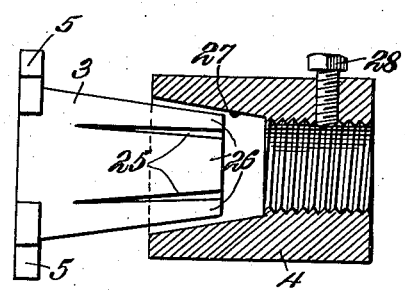
Fig. 6.
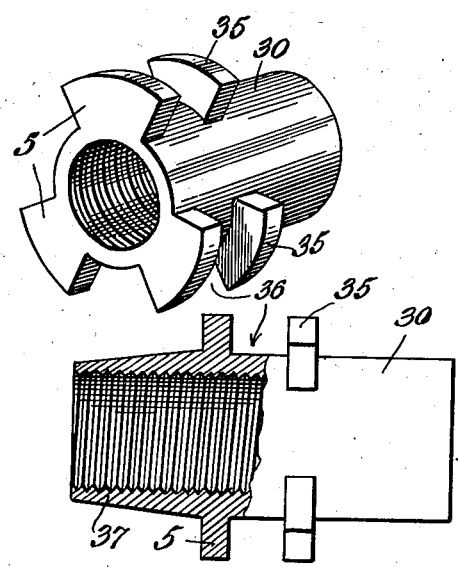
Fig. 8.
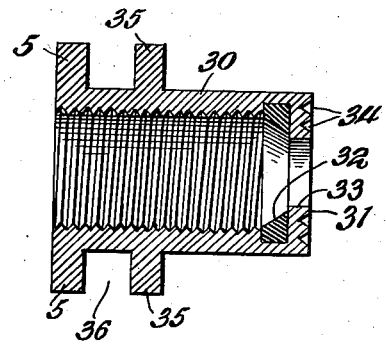
Fig. 9.
Fig. 10
Inventor,
C. W. Johnston,
By
Attorney Patented Mar. 7, 1939

2,149,681

UNITED STATES PATENT OFFICE 2,149,681

CONTROL DEVICE

Carey W. Johnston, Newark, N. J.

Application January 25, 1937, Serial No. 122,300

9 Claims. (Cl. 284—19)

This invention relates generally to controlling devices and has for its particular object to provide a device of this character which is efficient, simple of construction, easily assembled, and cheap. Heretofore similar devices have been untrustworthy, complicated, incorporating springs and various movable parts which eventually become inactive and thereby cause the device to become worthless and, as in the case of devices of this character which are used where human life depends upon them, an actual source of danger. In aviation it is paramount that such devices be of the utmost sturdiness, precision, and dependability. It will be seen from the following specification and drawings that I have entirely overcome all of the objections herein set forth of devices of this character.

With these and other objects in view the invention resides in the novel details of construction and combinations of parts more fully disclosed hereinafter and particularly pointed out in the claims.

Referring to the accompanying drawings forming a part of this specification and in which like numerals designate like parts in all the views—

Figs. 1a and 1b are detail views, partly in elevation and partly in section, illustrating construction modifications of deflating pin engagement over that shown in Fig. 1;

Fig. 5 is a perspective view of the female member showing a detail of construction;

Fig. 6 is a view partly in elevation and partly in section showing a modified form of male member;

Fig. 7 is a perspective view of one of the parts shown in Fig. 6;

Fig. 8 is a perspective view of a further modified form of a male member;

Fig. 9 is a vertical sectional view of the member shown in Fig. 8;

Fig. 10 is a view somewhat similar to Fig. 9 but showing a modification of the construction illustrated therein.

For clarity and simplicity in the specification and drawings, this invention is exemplified as relating generally to couplings for pipes where one of the pipes is provided with a valve which will be actuated when the pipes are in coupled position, and more specifically the invention is applicable to a coupling for a tire valve stem as used on automobiles or other vehicles, and in this latter respect constitutes an addition or improvement over the coupling disclosed in my U. S. Letters Patent No. 1,956,578 granted May 1, 1934, entitled Tire deflation indicator switch, in that the present invention is peculiarly adapted to use with a tire valve stem disposed at a relative distance from such an indicator switch as for example when dual tires are used as upon trucks or busses. However, it is to be understood that there are other uses to which this inventive device is applicable and therefore I reserve the right to various modifications which will not depart from the spirit of the invention, and all of the claims should be read in the light thereof.

Figure 4:
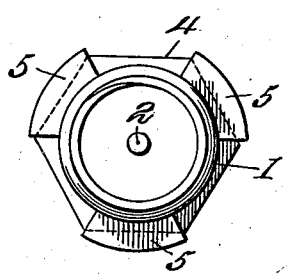
Fig. 4 is an end elevational view of the male member of the controlling device.

Referring to the drawings, the numeral 1 indicates a tire valve stem provided with the usual valve insides including the actuating pin 2 which when moved inwardly with respect to the valve stem will open the valve and let air pass therethrough. The male member of this coupling comprises a collar 3 threaded upon the external threads of the valve stem and adapted to be locked in position thereon by the locking nut 4, said collar and said nut having tapered coengaging surfaces as clearly shown in Fig. 1, and the collar as best seen in Fig. 4 is provided with a plurality of radially extending lugs indicated at 5 spaced around the male member.

A pipe 6 has its end secured within the socket portion 7 of a sleeve generally indicated by the numeral 8 having a loose sliding fit within a cylinder generally indicated by the numeral 9 the free end of the latter having an enlarged diameter and constituting the female member 10 of the coupling by virtue of a plurality of inwardly extending lugs indicated at 11 of substantially the same shape, spacing, and number as the lugs 5 on the male member, so that when the two members are coengaged the lugs 5 of the male member will pass through the spaces between the lugs 11 of the female member and, upon slight turning of the cylinder 9, come into locked position behind said lugs 11. One of the lugs 11 or 5 may be formed with an integral extension 12 serving as a stop to correctly position the lugs 5 and 11 in fully coupled position, see Fig. 5.

Figure 1:
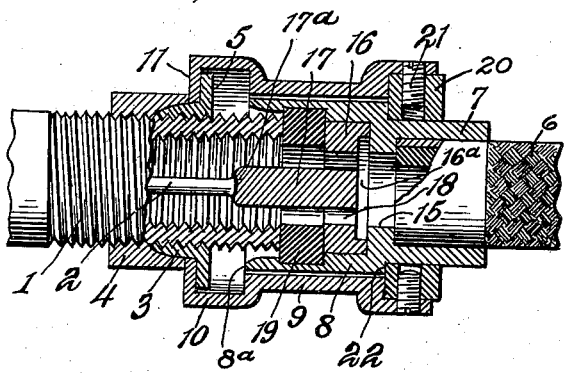
Fig. 1 is a vertical sectional view taken centrally of the parts in coupled position.
Figure 1:
Figure 1:
Figure 11:
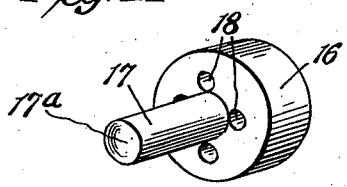
Fig. 11 is a perspective view of the deflating pin shown in Fig. 1.

The sleeve 8 is provided with a central bore 15 for the passage of air, and a button member has its base 16 nicely fitted within a correspondingly shaped recess within said sleeve, said button having a central stud 17 constituting a deflating pin which is of a length such that, when the coupling is made, said stud will engage and move the pin 2 of the valve insides thereby opening said valve. In Figs. 1 and 11 the end of the stud or pin is shown concave formed as at 17a to coact with the convex end of the valve insides, but obviously this construction could be reversed or other formations given to the stud 17 as indicated in Figs. 1a and 1b, the principal object being to have such a formation as will insure the coengagement of the members 2 and 17 throughout the time that the coupling is retained.

The base 16 of said button like member may be undercut or recessed as at 16a to reduce surface adhesion and is provided with a plurality of apertures indicated at 18 communicating with said recess through which air may pass, and a sealing member or ring 19 of rubber or other suitable resilient substance is disposed against the opposite surface of the base of said button and preferably seated in a groove-like depression formed in the inner surface of the sleeve 8 to prevent displacement of said ring, the position of said ring being such that the end of the valve stem 1 will be seated thereagainst when the coupling is complete, as clearly illustrated in Fig. 1, said ring having a central aperture of greater diameter than the stud 17 (which extends through said aperture) to permit passage of air. A collar 20 is provided having a sliding fit on the outer surface of the socket member 7 and is secured to the cylinder 9 by a plurality of screws or other suitable fastening means such as 21.

From what has been described, it will now be understood that the cylinder 9 may have a free sliding fit on the exterior surface of the sleeve 8 but that limit of this movement in one direction is caused by the collar 20 abutting the shoulder 22 of the sleeve 8 and that limit in the other direction is caused by the inner face of lug 11 striking the end 8a of the sleeve. Further it will be understood that at all times air or any other desired medium is capable of passing from the pipe 6 through the coupling into the valve stem 1, or vice versa, by virtue of the openings 15 and 18. Lastly the collar 3 is secured on the valve stem by the lock nut 4 in such position that when the coupling is completed the end of the valve stem will be firmly seated against the sealing member 19 to prevent any lateral escape of air or other medium and therefore to insure passage of the medium only from the pipe 6 into the valve stem or from the valve stem into said pipe, it being a further important feature that the parts 3 and 4 are so formed and dimensioned that, when locked to the valve stem, the space between the lugs 5 of the male member (collar) and the side of the nut 4 is just sufficient to receive the thickness of the lugs 11 of the female member whereby wobbling of the tire valve with respect to the cylinder 9 is substantially made impossible.

Figure 2:
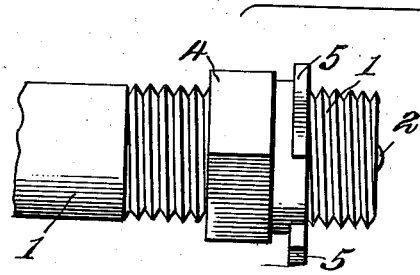
Fig. 2 is a view of the parts shown in Fig. 1 but separated to show certain relationships not appearing in Fig. 1.
Figure 2:
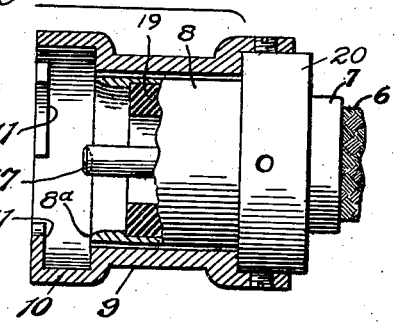
Figure 3:
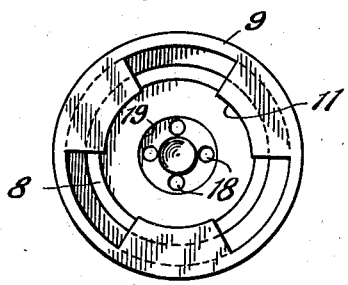
Fig. 3 is an end elevational view of the female member of the controlling device.

Whereas in Fig. 1 the pin 2 of the valve insides is shown depressed by virtue of contact with the stud 17 when the coupling is completed, in Fig. 2 said pin is shown in its position when the coupling is broken in which latter position the valve insides forms a closed valve.

With reference to Figs. 6 and 7, there is shown a modification of construction of the male member and its locking nut, substantially the only difference over that above described being that the former is provided in its skirt portion with a plurality of slots or grooves 25 so that when the nut 4 is coengaged with the collar there will be a compression of the skirt portions 26 in a radial direction to bind more tightly the collar 3 between the threads of the valve stem 1 and the inner tapered surface 27 of the lock nut 4, the latter being provided with a set screw 28 for securing the lock nut against backing off the collar 3.

According to the modification shown in Figs. 8, 9 and 10, the locking nut 4 may or may not be used. The male member comprises a cylinder 30 internally threaded for engagement with the valve stem but formed with an inwardly extending annular wall 31 at one end to limit the extent of the cylinder on said stem, there being provided a sealing ring 32 of lead or other suitable soft material serving as a seat for the extreme end of said valve stem, the wall 31 being centrally apertured as at 33 for the passage of air, and provided on its outer surface with a plurality of concentric grooves or protuberances such as 34 for engagement with the surface of the sealing ring 19 of the female member and thereby establish a more positive seal therewith. At a point along the cylinder 30 there is provided a plurality of outward radially extending lugs substantially the same as the lugs 5 previously described, and a second set of similar lugs indicated by the numeral 35 is positioned in axial registry with the lugs 5 but spaced therefrom a distance substantially equal to the thickness of the lugs 11 of the female member, and the distance of the lugs 35 from the end wall 31 is made such as to permit the proper seal of the valve stem on the sealing ring 19 when the coupling is completed. Therefore it will be seen that the double formation of the lugs 5 and 35 creates space 36 therebetween which corresponds to the space between the lugs 5 and the surface of the locking nut 4 as mentioned in connection with the description of the parts shown in Fig. 1 to prevent wobbling of the valve stem with respect to the sleeve 8 when the coupling is completed. Whereas the male members of this coupling as shown in Figs. 1, 2 and 6 are screwed onto the valve stem with the lugs 5 next to the outer end of the valve stem, the modified form of male member shown in Figs. 8 and 9 is screwed onto the valve stem in reverse order or with the lugs farthest away from the end of the valve stem. The construction shown in Fig. 10 is substantially a duplicate of that shown in Fig. 9 with the addition of an annular portion 37 having a conical exterior surface for coengagement with a locking nut such as 4 if desired, which portion may or may not be provided with slits such as 25.

In operation the ends of the two pipes are brought together in substantial coaxial alignment and the pipe 1 (tire valve stem) pressed firmly into the female member against the sealing ring 19 sufficiently to permit the engagement of the two sets of coupling lugs 5 and 11, this coengagement being accomplished by a slight rotational movement of the cylinder 9. While this is being done the stud 17 will have actuated the pin 2 of the valve insides and thereby opened the valve in the pipe 1 as a result of which the medium conducted by the pipes may pass freely through the ports 18.

I claim:

1. In a pipe coupling the combination of a pair of pipes and a sealing member therebetween; a valve in one of said pipes and including a valve pin; and means carried by the other pipe to actuate said pin when the ends of the pipes are coupled, said means comprising a stud having an integral base fixedly retained by said sealing member.

2. In a pipe coupling the combination of a pair of pipes and a sealing member therebetween; a valve in one of said pipes and including a valve pin; means carried by the other pipe to actuate said pin when the ends of the pipes are coupled; and a plurality of lugs carried by each pipe, the lugs of one pipe adapted to coengage with the lugs of the other pipe to hold said pipes in coupled relation, the lugs of one pipe adjustable thereon to compensate for compacting of said sealing member.

3. In a pipe coupling the combination of a pair of pipes; a valve in one of said pipes and including a valve pin; means carried by the other pipe to actuate said pin when the ends of the pipes are coupled; and a plurality of lugs carried by each pipe, the lugs of one pipe adapted to coengage with the lugs of the other pipe to hold said pipes in coupled relation, a lug of one pipe having a laterally bent edge portion adapted to limit the coengaging movement of the edge of a cooperating lug on the other pipe.

4. In a pipe coupling the combination of a pair of pipes, one of said pipes provided with external threads; a valve in one of said pipes and including a valve pin; means carried by the other pipe to actuate said pin when the ends of the pipes are coupled; and means to secure said pipes in coupled relation, said means comprising one set of members locked to said threads of the one pipe and a second set of members loosely carried by the other pipe, one set of members adapted to coengage with the second set of members.

5. In a pipe coupling the combinatiton of a pair of pipes, one of said pipes provided with external threads; a valve in one of said pipes and including a valve pin; means carried by the other pipe to actuate said pin when the ends of the pipes are coupled; and means to secure said pipes in coupled relation, said means comprising one set of members adjustably locked to said threads of the one pipe and a second set of members loosely carried by the other pipe, one set of members adapted to registrably and lockingly coengage with the second set of members.

6. In a pipe coupling the combination of a pair of pipes, one of said pipes provided with external threads; a valve in one of said pipes and including a valve pin; means carried by the other pipe to actuate said pin when the ends of the pipes are coupled; and means to secure said pipes in coupled relation, said means comprising one set of members locked to said threads of the one pipe and a second set of members integrally mounted upon a cylinder axially slidable on the other pipe, one set of members adapted to coengage with the second set of members.

7. In a pipe coupling the combination of a pair of pipes; a set of coupling members mounted on one of said pipes; a second set of coupling members mounted on the other pipe, said second set coengaging with said first named set to hold said pipes in coupled relation; and means threadingly engaging one of said pipes and lockingly securing one of said sets to said pipe, said means also engaging the other set to hold both sets in rigid relation to each other when the pipes are coupled.

8. In a pipe coupling the combination of a pipe; a valve pin for actuating a valve in said pipe; a second pipe having secured to its end a sleeve; a stud having a base slidably mounted in said sleeve, said stud registrable with said pin for actuating the valve when both of said pipes are coupled, said base having ports therethrough establishing passages for the medium conducted by said pipes; a sealing ring mounted in said sleeve and engageable with the end of said first named pipe and retaining said stud base in fixed position; a cylinder loosely mounted upon said sleeve and provided with a set of coupling members at its free end; and a second set of coupling members carried by said first named pipe and coengaging with said second named set to hold both of said pipes in coupled relation.

9. In a pipe coupling the combination of a pair of pipes and a sealing member therebetween; a valve in one of said pipes and including a valve pin; and means carried by the other pipe to actuate said pin when the ends of the pipes are coupled, said means comprising a stud having an integral base fixedly retained by said sealing member, said base receiving the thrust from the compressed sealing member when said pipes are coupled.

CAREY W. JOHNSTON.